(12) United States Patent
Wright et al.

(10) Patent No.: US 12,023,934 B2
(45) Date of Patent: Jul. 2, 2024

(54) CONDUCTIVE CONNECTIONS

(71) Applicant: Hewlett-Packard Development Company, L.P., Spring, TX (US)

(72) Inventors: Eleanor Sarah Wright, Vancouver, WA (US); Sean Mathew Instasi, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 96 days.

(21) Appl. No.: 17/919,018

(22) PCT Filed: Apr. 16, 2020

(86) PCT No.: PCT/US2020/028530
§ 371 (c)(1),
(2) Date: Oct. 14, 2022

(87) PCT Pub. No.: WO2021/211129
PCT Pub. Date: Oct. 21, 2021

(65) Prior Publication Data
US 2023/0234364 A1 Jul. 27, 2023

(51) Int. Cl.
*B41J 2/175* (2006.01)
*B29C 64/209* (2017.01)
*B33Y 30/00* (2015.01)

(52) U.S. Cl.
CPC ........... *B41J 2/1753* (2013.01); *B29C 64/209* (2017.08); *B33Y 30/00* (2014.12); *B41J 2/17553* (2013.01)

(58) Field of Classification Search
CPC .. B41J 2/1753; B41J 2/17553; B41J 2/17526; B41J 2/17513; B29C 64/209; B33Y 30/00

USPC .......................................................... 347/86
See application file for complete search history.

(56) References Cited

U.S. PATENT DOCUMENTS

| | | |
|---|---|---|
| 5,055,857 A | 10/1991 | Regnault |
| 6,082,852 A | 7/2000 | Soga et al. |
| 7,195,330 B2 | 3/2007 | Seino et al. |
| 7,413,300 B2 | 8/2008 | Von Essen et al. |
| 8,210,654 B2 | 7/2012 | Wei et al. |
| 8,439,487 B2 | 5/2013 | Clarke et al. |
| 8,584,331 B2 | 11/2013 | Dolan et al. |
| 8,628,173 B2 | 1/2014 | Stephens et al. |
| 8,904,860 B2 | 12/2014 | Leiser et al. |
| 10,214,023 B1 | 2/2019 | Stephens |
| 10,471,711 B2 | 11/2019 | Karita et al. |
| 2004/0165028 A1 | 8/2004 | Ito et al. |
| 2006/0216491 A1 | 9/2006 | Ward et al. |

(Continued)

FOREIGN PATENT DOCUMENTS

| | | |
|---|---|---|
| JP | 2006-327048 A | 12/2006 |
| JP | 4743461 B2 | 8/2011 |

(Continued)

*Primary Examiner* — Jason S Uhlenhake
*Assistant Examiner* — Alexander D Shenderov
(74) *Attorney, Agent, or Firm* — Foley & Lardner LLP

(57) ABSTRACT

Examples of conductive connections are described herein. Some examples of a fluid ejection device may include an electrically conductive non-metal structure in contact with fluid in a fluid reservoir. Some examples of the fluid ejection device may include conductive adhesive forming a conductive connection between the electrically conductive non-metal structure and circuitry.

15 Claims, 7 Drawing Sheets

(56) References Cited

U.S. PATENT DOCUMENTS

| | | |
|---|---|---|
| 2010/0295562 A1 | 11/2010 | Fuetterer et al. |
| 2012/0026236 A1 | 2/2012 | Fujii |
| 2012/0089180 A1* | 4/2012 | Fathi ........................ B32B 7/14 |
| | | 257/E23.116 |
| 2018/0179632 A1 | 6/2018 | Teranishi |
| 2018/0290458 A1 | 10/2018 | Govyadinov et al. |
| 2019/0092007 A1* | 3/2019 | Morisue ................ B41J 2/1628 |
| 2020/0061992 A1 | 2/2020 | Chen et al. |
| 2020/0114655 A1 | 4/2020 | Escudero Gonzalez et al. |
| 2021/0229440 A1* | 7/2021 | Cumbie ................ B41J 2/1632 |

FOREIGN PATENT DOCUMENTS

| | | |
|---|---|---|
| JP | 2012-046719 A | 3/2012 |
| WO | 2015/080730 A1 | 6/2015 |

\* cited by examiner

CONDUCTIVE CONNECTIONS

BACKGROUND

Some types of printing utilize liquid. For example, some types of printing eject liquid onto media or material to produce a printed product (e.g., two-dimensional (2D) printed content, three-dimensional (3D) printed objects). In some examples, a printhead may be utilized to eject liquid, such as ink, onto paper to print text and/or images. In some examples, a printhead may be utilized to eject liquid, such as fusing agent, onto powder to form a 3D printed object.

DETAILED DESCRIPTION

Figure 1:
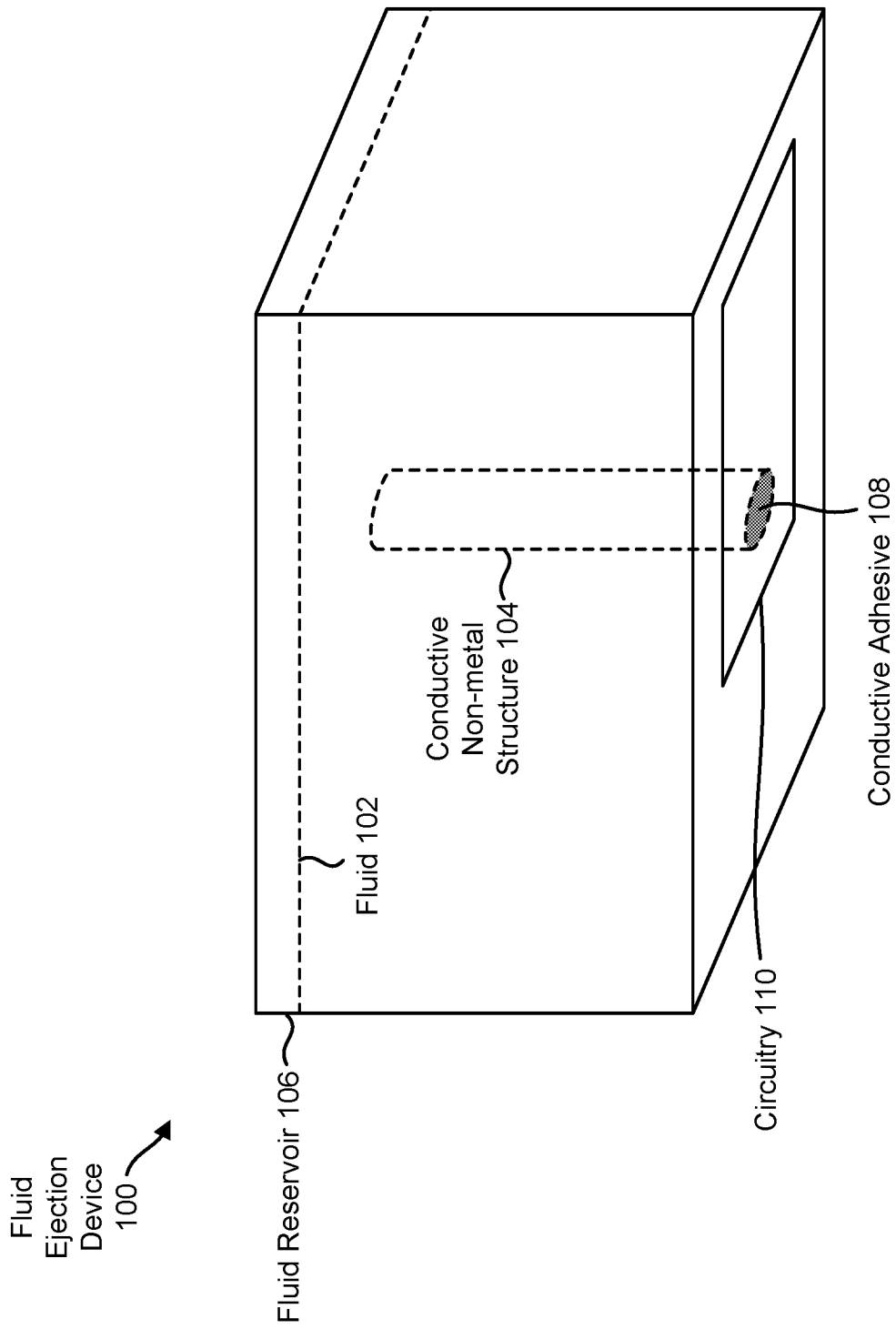
FIG. 1 is a diagram illustrating a perspective view of an example of a fluid ejection device.

Some issues arise in the context of storing and/or utilizing fluids. A fluid is a liquid substance. In some examples, a fluid may damage (e.g., corrode, etch, etc.) a material or materials in contact with the fluid. For instance, electrochemical reactions may occur at an interface between fluid and material. In some examples, the electrochemical reactions may cause etching, where some or all of the material may move into the fluid.

An open circuit potential is a naturally occurring voltage that may occur due to electrochemical reactions at an interface between fluid and material (e.g., solid material). In some examples, the material may be silicon or may include silicon (e.g., silicon-based circuitry). In some examples, electrochemical reactions may cause etching of silicon into fluid that is in contact with the silicon.

In some examples, a voltage may be applied to the material (e.g., silicon). For instance, if a positive voltage is applied to silicon, the etching may increase. A high enough voltage may promote passivation (e.g., oxidation of the silicon surface). In some examples, a passivated surface may etch more slowly than a plain surface. For instance, a passivated silicon surface may etch more slowly than a plain silicon surface.

Some examples of the techniques described herein may reduce, mitigate, and/or neutralize the open circuit potential in order to reduce, mitigate, and/or neutralize etching at an interface between a fluid and a material. For instance, a conductive material may be electrically connected to a material (e.g., silicon). The conductive material may form a galvanic couple with the material, which may change the open circuit potential (e.g., between fluid and silicon). In some examples, the changed open circuit potential may be high enough to place the material into a passivation range, without applying an external bias.

In some examples, the foregoing issues may arise in the context of fluid reservoirs. A fluid reservoir is a container for fluid. Examples of fluid reservoirs include print liquid containers, print liquid supplies, etc. In some examples, a fluid reservoir may be included in a device, such as a fluid ejection device, print cartridge, printer, etc. Print liquid is a fluid for printing. Examples of print liquid include ink and fusing agent. In some examples, a material that is prone to etching in fluid (e.g., print liquid) may be exposed to the fluid. For example, silicon circuitry (e.g., silicon printhead circuitry and/or other circuitry) may be in contact with the fluid. Etching of the silicon circuitry may occur, which may cause circuitry failure and/or contamination of the fluid (e.g., print liquid). Accordingly, it may be beneficial to reduce, mitigate, and/or neutralize etching of a material in contact with a fluid.

In some examples, fluid reservoirs (e.g., print cartridges) may be constructed of thermoplastics. Thermoplastics may be injection molded and may be compatible with high volume manufacturing and/or assembly methods. It may be beneficial for the construction materials (e.g., materials to construct components of fluid reservoirs) to be compatible with print liquid and/or to be robust to environmental conditions over the life of the fluid reservoir. In some examples, fluid reservoirs may be constructed from thermoplastics such as polypropylene (PP), low-density polyethylene (LDPE), high-density polyethylene (HDPE), polyethylene terephthalate (PET), polycarbonate (PC), and/or blends thereof (e.g., copolymers such as a polypropylene-polyethylene blend). Some thermoplastics may be compatible with high volume assembly methods such as injection molding and/or welding. Welding is an action where materials fuse together. For example, welding may form bonds (e.g., molecular bonds) between materials. In some examples, welding materials may include a phase change of (e.g., melting and/or liquifying), intermingling, and/or mixing the materials. In some examples, welding may be capable of creating waterproof seals to contain the print liquid. In some examples, welding may occur without another bonding agent, additional part, adhesive, and/or sealant.

Throughout the drawings, identical reference numbers may designate similar, but not necessarily identical, elements. Similar numbers may indicate similar elements. When an element is referred to without a reference number, this may refer to the element generally, without necessary limitation to any particular figure. The figures are not necessarily to scale, and the size of some parts may be exaggerated to more clearly illustrate the example shown. Moreover, the drawings provide examples in accordance with the description; however, the description is not limited to the examples provided in the drawings.

FIG. 1 is a diagram illustrating a perspective view of an example of a fluid ejection device 100. Examples of the fluid ejection device 100 include a print cartridge, a print component, etc. The fluid ejection device 100 may include a fluid reservoir 106. Examples of the fluid reservoir 106 may include print liquid supplies, print liquid containers, etc. The fluid reservoir 106 may contain fluid 102. The fluid ejection device 100 may contain and/or transfer fluid 102 (e.g., print liquid, ink, agent, etc.). In some examples, the fluid ejection device 100 may be designed to interface with a host device. A host device is a device that uses and/or applies fluid 102.

Examples of a host device include a printer, an ink jet printer, 3D printer, etc. In some examples, it may be beneficial to replenish or replace the fluid ejection device 100 when some or all of the fluid 102 has been utilized.

The fluid ejection device 100 and/or fluid reservoir 106 may include a barrier or barriers (e.g., wall(s)) for containing the fluid 102 (e.g., print liquid). For example, the fluid ejection device 100 may be made of a plastic, polymer, resin, thermoplastic (e.g., PP, LDPE, HDPE, PET, PC, copolymers, etc.), etc., or a combination of thermoplastics. For instance, the fluid ejection device 100 or a portion of the fluid ejection device 100 (e.g., the fluid reservoir 106) may be molded (e.g., injection molded) from a thermoplastic or thermoplastics.

The fluid ejection device 100 may include an electrically conductive non-metal structure 104 in contact with fluid 102 in the fluid reservoir 106. In some examples, the electrically conductive non-metal structure 104 may include carrier material and electrically conductive non-metal material. A carrier material is a material that supports or carries another material. Some examples of the carrier material may include plastics, polymers, resins, thermoplastics (e.g., PP, LDPE, HDPE, PET, PC, copolymers, etc.), etc., or a combination of thermoplastics. For instance, the carrier material may include a polymer.

An electrically conductive non-metal material is a material that is electrically conductive and is not a metal. For example, the electrically conductive non-metal material may be or may include graphite, carbon, or carbon-graphite. In some examples, the electrically conductive non-metal material may include graphite fibers. For example, the electrically conductive non-metal structure 104 may include a combination of polymer and graphite (e.g., graphite fibers in a resin). For instance, the electrically conductive non-metal structure 104 may include graphite fibers embedded in and/or through the electrically conductive non-metal structure 104 (e.g., carrier material). It may be beneficial to utilize conductive non-metal material instead of metal for electrical conduction in some examples. For instance, some conductive non-metal materials (e.g., graphite) may be less expensive than some metals (e.g., gold). Some conductive non-metal materials (e.g., graphite) may be more durable and/or less prone to damage than some metals (e.g., gold). For instance, a graphite-loaded plastic pin may be less prone to scratching and/or failure than a gold-coated pin. Some combinations of a conductive non-metal material (e.g., graphite) and carrier material (e.g., polymer, plastic, etc.) may provide some improved manufacturing properties relative to some metals (e.g., gold). For instance, a combination of graphite and plastic may provide better molding, welding, and/or sealing properties with plastics than gold.

In some examples, the electrically conductive non-metal structure 104 is an elongated structure that protrudes into the fluid ejection device 100. For instance, an elongated structure may be longer than wide (or one dimension of the structure may be greater than another). In some examples, the electrically conductive non-metal structure 104 may be cylindrical, polygonal, prismatic, rectangular, symmetrical, asymmetrical, irregularly shaped, etc. As used herein, the term "cylindrical" may mean curved over a length. For example, "cylindrical" may denote a curved, circular, elliptical, conical, etc., shape over a length. A cylindrical structure may be partially cylindrical (e.g., cylindrical on a part of the structure) or may be cylindrical over a dimension of the structure. In some examples, cylindrical structures may be beneficial with a rotationally symmetric shape that may be oriented with any rotational orientation in a molding tool. Other shapes may be utilized in some examples. Examples of the conductive non-metal structure 104 are given in FIG. 7.

In some examples, the fluid ejection device 100 (e.g., fluid reservoir 106) may include a routing. A routing is a channel, passage, slot, or opening in a material. For example, the routing may be a channel (e.g., passage through a wall) between an inside of the fluid ejection device 100 (e.g., fluid reservoir 106) and an outside of the fluid ejection device 100 (e.g., fluid reservoir 106).

In some examples, a portion of the electrically conductive non-metal structure 104 may be disposed on an outside of the fluid ejection device 100. For example, the electrically conductive non-metal structure 104 (e.g., a portion of the electrically conductive non-metal structure 104) may be situated through the routing. A portion of the electrically conductive non-metal structure 104 may be disposed outside of the fluid ejection device 100, and a portion of the electrically conductive non-metal structure 104 may be disposed within the fluid ejection device 100. For example, the electrically conductive non-metal structure 104 may include a head disposed outside of the fluid reservoir 106. A head is a protrusion, protuberance, projection, or extension. The electrically conductive non-metal structure 104 may provide electrical conduction between the outside of the fluid ejection device 100 and the inside of the fluid ejection device 100.

In some examples, the electrically conductive non-metal structure 104 may be welded to the routing of the fluid ejection device 100. In some examples, the welding between the electrically conductive non-metal structure 104 and the routing may form a waterproof seal, which may prevent the fluid 102 from flowing out of the routing. For example, welding may occur during attachment of the electrically conductive non-metal structure 104 to the routing. In some examples, welding may occur during molding of the routing (e.g., barrier or wall of the fluid reservoir 106) around the electrically conductive non-metal structure 104. For instance, liquid material (e.g., polymer) may be injection molded around a portion of the electrically conductive non-metal structure 104 to form the fluid reservoir 106 or a portion of the fluid reservoir 106 (e.g., routing). The heat of the liquid or molten material may cause the electrically conductive non-metal structure 104 or a portion of the electrically conductive non-metal structure 104 (e.g., carrier material) to undergo a phase change or partial phase change (e.g., melting, partial liquefaction, etc.), which may weld and/or bond the electrically conductive non-metal structure 104 to the routing as the routing cools and/or solidifies. In some examples, the electrically conductive non-metal structure 104 (e.g., carrier material of the electrically conductive non-metal structure 104) and the routing may have an overlapping melting temperature range. Some examples of melting temperatures of materials that may be utilized for the fluid ejection device 100, routing, and/or carrier material of the electrically conductive non-metal structure 104 are given as follows. Polypropylene may have a melting temperature of approximately 160 degrees Celsius (C). With a blended copolymer (e.g., polypropylene with polyethene), melting temperatures may be within a range between approximately 130 C and 160 C depending on the blend.

In some examples, the electrically conductive non-metal structure 104 may be press-fit to the routing. For instance, the electrically conductive non-metal structure 104 may include a press-fit lead-in shape. Some examples may utilize molding and/or press-fitting to attach the electrically conductive non-metal structure 104 to the fluid reservoir (e.g., routing).

In some examples, the fluid ejection device 100 may include circuitry 110. Circuitry is an electronic circuit or circuits. In some examples, circuitry may include a connection or connections (e.g., metal wire(s), trace(s), etc.), semiconductor circuitry (e.g., transistor(s)), and/or another component or components (e.g., resistor(s), heater(s), capacitor(s), inductor(s), etc.). In some examples, circuitry may include a carrier material or materials. Examples of a carrier material may include substrate, silicon (Si), film, and/or support material (e.g., plastic, glass, fiberglass), etc. In some examples, the circuitry 110 may include metal (e.g., copper) traces embedded in flexible film. In some examples, the circuitry 110 may include silicon or silicon circuitry. The silicon or silicon circuitry (e.g., a portion of the silicon circuitry) may be in contact with the fluid 102.

In some examples, the fluid ejection device 100 includes conductive adhesive 108. Conductive adhesive is an adhesive (e.g., glue, joining material) that is electrically conductive. For example, conductive adhesive may be an adhesive that is conductive due to the presence of conductive metal filler (e.g., copper, silver, etc.) and/or conductive non-metal filler (e.g., carbon, graphite, etc.) in the adhesive. In some examples, the conductive adhesive 108 may be cured. For example, the conductive adhesive 108 may be cured by applying radiation (e.g., heat, ultraviolet (UV) radiation, microwave radiation, etc.). The conductive adhesive 108 may form a conductive connection between the electrically conductive non-metal structure 104 and the circuitry 110. For example, the conductive adhesive 108 may join the electrically conductive non-metal structure 104 to the circuitry 110 (e.g., to a contacting region of the circuitry 110).

The conductive adhesive 108 may be utilized to mitigate (e.g., reduce, neutralize) an electrical potential (e.g., open circuit potential) between the fluid 102 and the circuitry 110 (e.g., between the electrically conductive non-metal structure 104 and the circuitry 110). In some examples, mitigating the electrical potential may reduce etching of silicon. For example, mitigating the electronic potential of silicon of the circuitry 110 that is exposed to the fluid 102 may reduce etching of the silicon. Etching of the silicon may result in degradation and/or failure of silicon circuitry (e.g., a silicon printhead).

In some examples, the circuitry 110 may include or may be coupled to a printhead. A printhead is a structure and/or circuitry to eject fluid (e.g., print liquid). For instance, a printhead may be utilized to eject fluid from the fluid reservoir 106. In some examples, a printhead may include (e.g., may be manufactured with) silicon structure(s) and/or silicon-based circuitry that may be in contact with the fluid 102. For example, the printhead may include a fluidic structure or structures (e.g., print liquid feed hole or holes). A fluidic structure is a structure to hold and/or convey fluid. The fluidic structure(s) (e.g., feed hole(s)) may be used to pass (e.g., eject) fluid 102 from the fluid reservoir 106 to an exterior of the fluid ejection device (e.g., onto print media, material, etc.). In some examples, the conductive adhesive 108 may help to mitigate etching of printhead fluidic structures by providing a conductive joint between the electrically conductive non-metal structure 104 and the circuitry 110, thereby reducing the electrical potential. In some examples, the fluid ejection device 100 may be part of the print cartridge. For instance, a print cartridge may include the fluid reservoir 106 and the circuitry 110 with a printhead.

In some examples, the circuitry 110 may include grounding circuitry. In some examples, the electrically conductive non-metal structure 104 may be coupled to grounding circuitry by the conductive adhesive 108. Grounding circuitry is a conductor, connection, and/or circuitry. For example, grounding circuitry may be a conductor, connection, and/or circuitry at a potential (e.g., reference potential, 0 volts (V), etc.), and/or may be a return path (e.g., common return path) for current.

In some examples, grounding circuitry may be coupled to a printhead. For instance, the grounding circuitry may be coupled to both the electrically conductive non-metal structure 104 and to a printhead that is in contact with the fluid 102. The conductive adhesive 108 may mitigate (e.g., reduce, neutralize, etc.) an electrical potential between the printhead and the fluid 102. For example, the grounding circuitry may be coupled to the electrically conductive non-metal structure 104 by the conductive adhesive 108 and to the printhead, which may reduce a voltage between the fluid 102 and the printhead to a relatively small difference or zero. In some examples, the printhead may include silicon, and the electrically conductive non-metal structure 104 may reduce fluid etching of the silicon by mitigating the electrical potential.

Figure 2A:
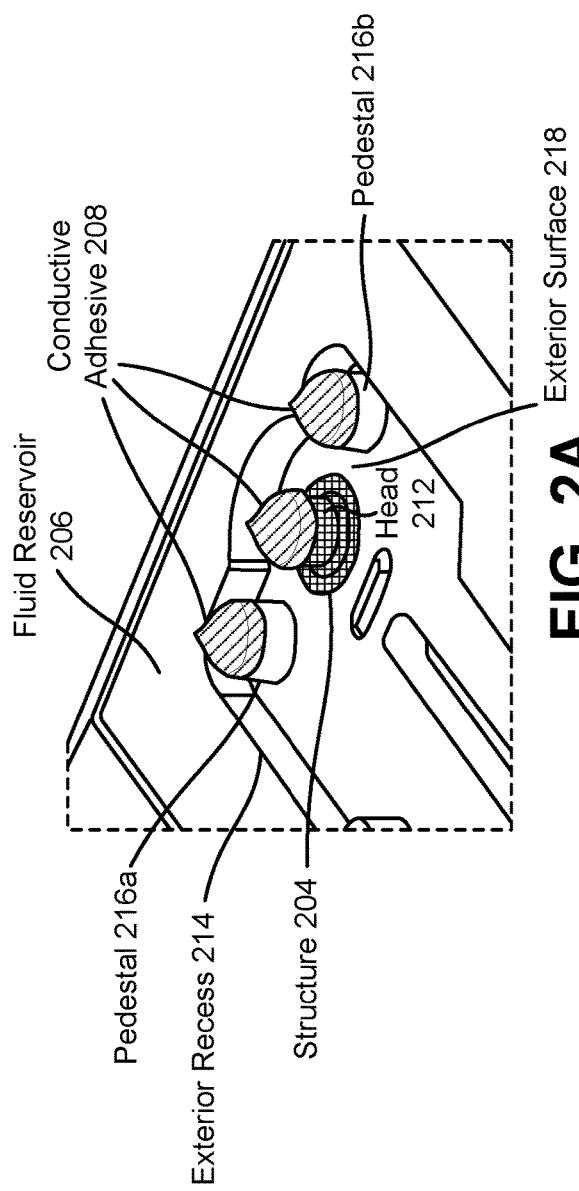
FIG. 2A is a diagram illustrating a perspective view of a portion of an example of a fluid reservoir.

FIG. 2A is a diagram illustrating a perspective view of a portion of an example of a fluid reservoir 206. The fluid reservoir 206 described in relation to FIG. 2A may be an example of the fluid reservoir 106 described in relation to FIG. 1. For example, FIG. 2A illustrates a portion of a fluid reservoir 206 that may interface with circuitry (e.g., circuitry 110 described in relation to FIG. 1). In some examples, the fluid reservoir 206 may be included in a fluid ejection device (e.g., the fluid ejection device 100 described in relation to FIG. 1).

An electrically conductive non-metal structure 204 may be disposed through a routing of the fluid reservoir. In some examples, the electrically conductive non-metal structure 204 may include a head 212 disposed outside of the fluid reservoir 206. For instance, the head 212 may protrude beyond a surface (e.g., wall) of the fluid reservoir 206.

In some examples, a fluid reservoir may include an exterior recess. An exterior recess is a depression in an exterior structure (e.g., wall). For example, the fluid reservoir 206 may include an exterior recess 214. In some examples, the exterior recess 214 may house circuitry or a portion of circuitry (e.g., printhead circuitry).

In some examples, the head 212 of the electrically conductive non-metal structure 204 may be disposed within the exterior recess 214 of the fluid reservoir 206. For instance, the head 212 may protrude within the exterior recess 214. In some examples, the head 212 may enable improved adherence between the electrically conductive non-metal structure 204 and circuitry. For instance, the head 212 may provide increased surface area for conductive adhesive 208 and/or may provide improved mechanical coupling or interference (relative to a flat surface, for example). This may improve structural robustness in a joint between the electrically conductive non-metal structure 204 and circuitry.

In some examples, a pedestal or pedestals may be disposed on an exterior surface of a fluid reservoir. For instance, the fluid reservoir 206 may include a pedestal or pedestals 216*a-b* disposed on the exterior surface 218 of the fluid reservoir 206. A pedestal is a protruding structure. For example, a pedestal may be a protrusion or raised structure. In some examples, a pedestal may include a flat extremity (e.g., end, top, etc.). In the example of FIG. 2A, the pedestals 216*a-b* are cylindrical in shape. In some examples, other shapes (e.g., rectangular, prismatic, hemispherical, irregular, smooth, textured, etc.) may be utilized. In some examples, the pedestal(s) 216a-b may enable improved adherence between the fluid reservoir 206 and circuitry. For instance, the pedestal(s) 216a-b may provide increased surface area for conductive adhesive 208 and/or may provide improved mechanical coupling or interference (relative to a flat surface, for example). This may improve structural robustness in a joint between the fluid reservoir 206 and circuitry. For example, circular pedestals 216a-b in the fluid reservoir 206 may be utilized for conductive adhesive 208 dollops, and may provide improved structural support for the underside of circuitry (e.g., flexible circuitry).

In some examples, a fluid ejection device (e.g., print cartridge) may undergo a mechanical stress or stresses. The increased mechanical robustness described herein may be beneficial to improve a fluid ejection device capability to withstand the stress(es). For instance, a cap interface in a host device (e.g., printer) may provide a mechanical force on the circuitry 210. A wiper in a host device (e.g., printer) may pass across the circuitry 210 (e.g., printhead) and/or fluid reservoir, which may create a drumming effect on the circuitry 210 (if not secured in place). Some of these stresses (e.g., forces) may weaken the circuitry 210 and/or circuitry structures (e.g., an encap that protects an electrical connection between a printhead and the circuitry 210). Accordingly, the enhanced robustness provided by the head 212 and/or pedestal(s) 216a-b may be beneficial.

In some examples, a pedestal or pedestals may be distanced (e.g., separated by a distance such as 0.1 millimeter (mm), 0.5 mm, 1 mm, 2 mm, 3 mm, 5 mm, 10 mm, etc.) from an electrically conductive non-metal structure. In the example of FIG. 2A, the pedestals 216a-b are distanced from the electrically conductive non-metal structure 204. In some examples, a pedestal or pedestals may protrude from a same plane as a head of an electrically conductive non-metal structure. For instance, the pedestals 216a-b and the head 212 may protrude from a surface that includes a portion of an exterior wall of the fluid reservoir 206 (e.g., back of the exterior recess 214, part of the exterior surface 218, etc.) and a portion of the electrically conductive non-metal structure 204.

In some examples, the pedestals 216a-b may be disposed in opposite directions in relation to the electrically conductive non-metal structure 204. In the example of FIG. 2A, one pedestal 216a is distanced from an opposite side (e.g., radially opposite direction, 180 degrees, etc.) of the electrically conductive non-metal structure 204 relative to another pedestal 216b.

In some examples, a pedestal or pedestals may be disposed within an exterior recess of a fluid reservoir. In the example of FIG. 2A, the pedestals 216a-b are disposed within the exterior recess 214.

As illustrated in FIG. 2A, conductive adhesive 208 may be applied (e.g., dispensed) on the electrically conductive non-metal structure 204 and/or on the pedestal(s) 216a-b. In some examples, the conductive adhesive 208 (e.g., dollops) may be dispensed onto the head 212 and onto the pedestals 216a-b before attaching circuitry. The conductive adhesive 208 may be utilized to join (e.g., attach, adhere, etc.) circuitry to the electrically conductive non-metal structure 204 and/or to the fluid reservoir 206 (e.g., to the pedestal(s) 216a-b). For example, the conductive adhesive 208 may be applied, and then circuitry may be placed on the conductive adhesive 208. In some examples, conductive adhesive may be applied to the circuitry (e.g., to the circuitry first with or without conductive adhesive being applied to an electrically conductive non-metal structure and/or to pedestal(s)) to join the circuitry with the electrically conductive non-metal structure and/or with the pedestal(s).

Figure 2B:
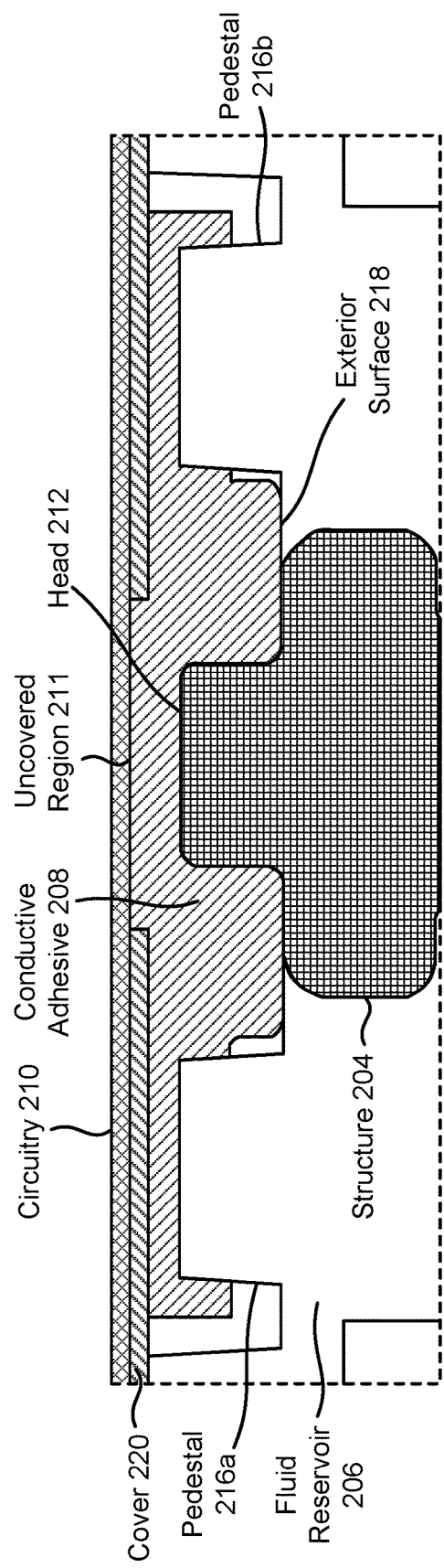
FIG. 2B is a diagram illustrating a cross-sectional view of a portion of the example of the fluid reservoir described in relation to FIG. 2A.

FIG. 2B is a diagram illustrating a cross-sectional view of a portion of the example of the fluid reservoir 206 described in relation to FIG. 2A. In the example of FIG. 2B, circuitry 210 has been joined (e.g., attached) to the electrically conductive non-metal structure 204 and to the fluid reservoir 206. A cover 220 for the circuitry is also illustrated. The cover 220 may cover and/or protect a portion of the circuitry 210. In some examples, the circuitry 210 may include an uncovered region 211. For instance, the uncovered region 211 may not be covered by the cover 220 (e.g., may be an unprotected region before assembly). In some examples, the cover 220 may be adhered to the conductive adhesive 208, to the fluid reservoir 206 and/or to the electrically conductive non-metal structure 204.

The conductive adhesive 208 may join the circuitry 210 to the electrically conductive non-metal structure 204 and to an exterior surface 218 of the fluid reservoir 206. For example, the conductive adhesive 208 may adhere the circuitry 210 and/or the cover 220 to the head 212 of the electrically conductive non-metal structure 204 and/or to the pedestal(s) 216a-b of the fluid reservoir 206.

As the circuitry 210 is placed on the conductive adhesive 208, the conductive adhesive 208 may spread out to cover the circuitry 210 (e.g., an uncovered region 211 of the circuitry 210). In some examples, the conductive adhesive 208 may form around the head 212 and/or the pedestal(s) 216a-b. In some examples, the conductive adhesive 208 may partially or completely fill a distance or distances (e.g., gap(s)) between the head 212 and the pedestal(s) 216a-b. After curing, the conductive adhesive 208 may provide mechanical support to the underside of the circuitry 210. In some examples, the conductive adhesive 208 may allow some flexion of the conductive adhesive 208 with forces on the circuitry 210, which may prevent or reduce risk of shearing at the interface between the circuitry 210 and the conductive adhesive 208. In some examples, the conductive adhesive 208 may have a relatively low glass transition temperature (Tg), which may allow the flexion. In some examples, a Tg for the conductive adhesive 208 may be within a range from −25 degrees Celsius (C) to 50 degrees C. The Tg for the conductive adhesive 208 may depend on the cure temperature, cure time, and/or material properties of the adhesive. In some examples, it may be beneficial to utilize conductive adhesive 208 that is uncured initially, as this may reduce and/or avoid mechanical stresses on the circuitry 210 during assembly.

Figure 3:
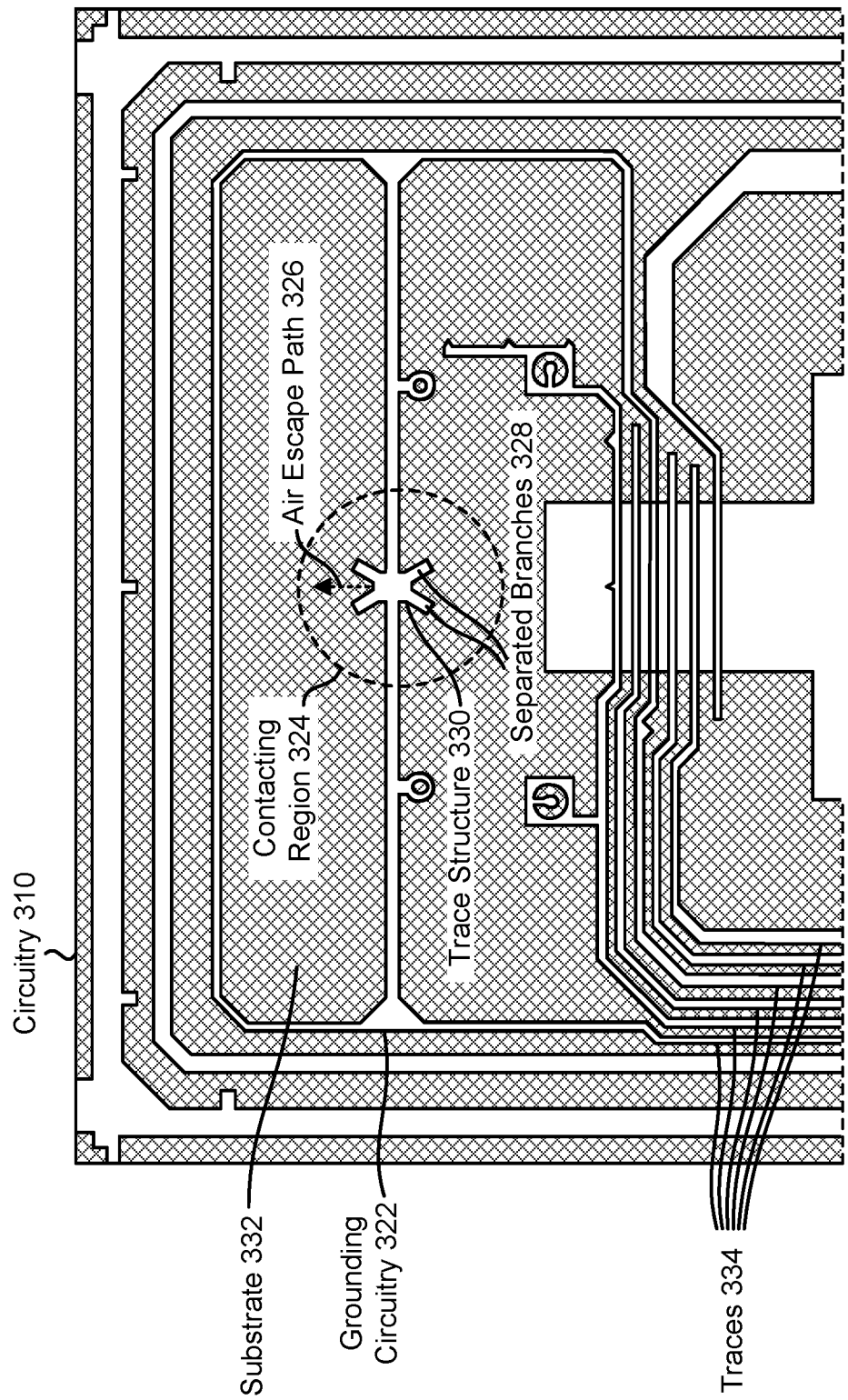
FIG. 3 is a diagram illustrating an example of a portion of circuitry that may be joined to an electrically conductive non-metal structure using conductive adhesive.

FIG. 3 is a diagram illustrating an example of a portion of circuitry 310 that may be joined to an electrically conductive non-metal structure using conductive adhesive. In some examples, the circuitry 310 may be an example of the circuitry 110, 210 described in relation to FIG. 1 and/or FIGS. 2A-2B. The circuitry 310 may include a substrate 332 and metal traces 334. In some examples, the circuitry 310 may be flexible. For example, the substrate 332 may be a flexible material, such as polyimide (PI), polyethylene naphthalate (PEN), and/or polyethylene terephthalate (PET), etc. Some examples of metal traces 334 are illustrated in FIG. 3. In some examples, a different number and/or arrangement of metal traces may be utilized.

The circuitry 310 may include a contacting region 324. A contacting region is an area of circuitry to be contacted with and/or covered by conductive adhesive. For example, the circuitry 310 may include grounding circuitry 322. Conductive adhesive may join the grounding circuitry 322 to an electrically conductive non-metal structure. For example, the grounding circuitry 322 may be exposed in the contacting region 324 to enable contact with and/or adherence with conductive adhesive and/or an electrically conductive non-metal structure.

In some examples, the circuitry 310 (e.g., grounding circuitry 322) may include a trace structure 330. A trace structure 330 is an arrangement of a trace. In some examples, a contacting region 324 of the circuitry 310 may include an air escape path 326. An air escape path is a path or channel that allows air movement. For example, when conductive adhesive contacts and spreads over the contacting region 324, the air escape path 326 may allow air in the contacting region 324 to escape as the contacting region 324 fills with the conductive adhesive.

In some examples, designs that allow for a pathway or pathways (e.g., air escape path 326) for air to escape out from between substrate and conductive adhesive may be beneficial. Any air trapped in the interface may be a locale for moisture to accumulate, which may accelerate corrosion. For instance, when air gets trapped in the conductive adhesive and/or on circuitry, moisture (e.g., moisture from fluid in a fluid reservoir, from fluid being ejected, and/or from environmental humidity) may collect in the air pocket(s). The moisture may degrade and/or weaken the electrical and/or mechanical connection(s) between conductive adhesive, circuitry, and/or an electrically conductive non-metal structure. For example, moisture may cause the conductive adhesive to separate from circuitry, which may lead to silicon etching and/or circuitry failure.

In some examples, an air escape path may be formed with a trace structure that leaves an opening or separation from the trace structure in a contacting region. In some examples, an air escape path may be formed by not creating an island or islands of substrate surrounded by trace structure in a contacting region. For instance, it may be beneficial to avoid an area or areas enclosed between traces, which may lead to air getting trapped between traces as conductive adhesive cures and/or solidifies. In some examples, the conductive adhesive may physically protect a trace or traces (e.g., trace(s) in an uncovered region or contacting region 324) from environmental conditions, such as moisture.

In some examples, the contacting region 324 may include a trace structure 330 having separated branches 328. For instance, branching traces may provide edges and faces for the conductive adhesive to adhere to. For example, branching traces may improve adhesion to traces, as adhesion to gold-plated flex traces may be challenging. In the example of FIG. 3, the trace structure 330 is an asterisk shape, which may provide multiple air escape paths. In some examples, different trace structures with a same or different number of branches may be utilized. In some examples, a cover (not shown in FIG. 3) may be disposed over an area or areas of the circuitry 310 that are not in the contacting region 324.

Figure 4:
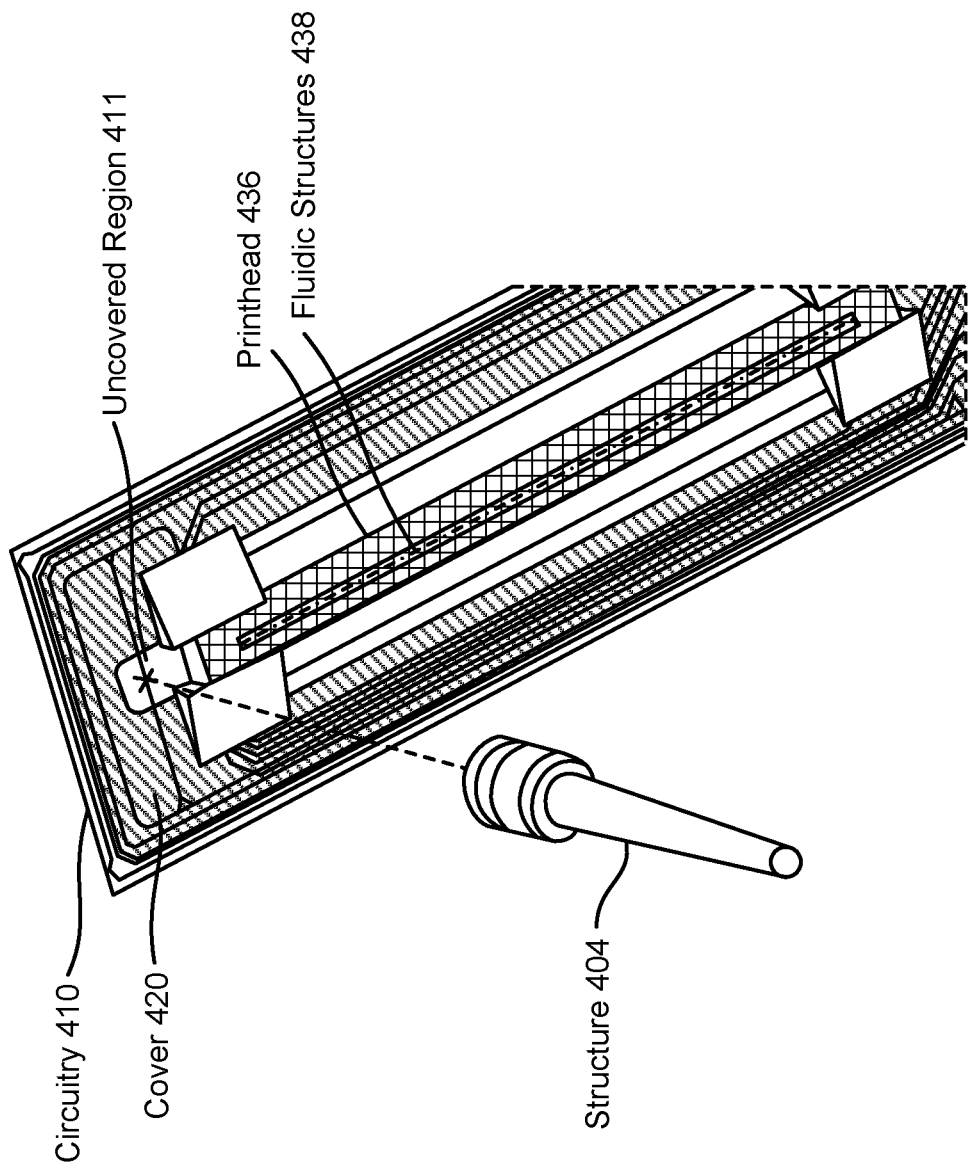
FIG. 4 is a diagram illustrating a perspective view of an example of a portion of circuitry that may be joined to an electrically conductive non-metal structure with conductive adhesive.

FIG. 4 is a diagram illustrating a perspective view of an example of a portion of circuitry 410 that may be joined to an electrically conductive non-metal structure 404 with conductive adhesive. The circuitry 410 may be an example of circuitry 110, 210, 310 described in relation to FIG. 1, FIGS. 2A-2B, and/or FIG. 3. The circuitry 410 may include and/or may be coupled to a cover 420. The cover 420 may protect traces (e.g., a portion of traces) of the circuitry 410. The circuitry 410 may include an uncovered region 411. The electrically conductive non-metal structure 404 may be joined with the uncovered region (and/or a portion of the cover 420) with conductive adhesive. In some examples, the circuitry 410 may include a printhead 436 (e.g., silicon printhead circuitry).

In some examples, the printhead 436 (e.g., silicon printhead circuitry) may be coupled to the circuitry 410. The printhead 436 may include fluidic structures 438 (e.g., print liquid feed holes). A conductive adhesive may reduce an electrical potential between the electrically conductive non-metal structure 404 (e.g., pin) and the printhead 436 to reduce etching of the fluidic structures 438.

Figure 5:
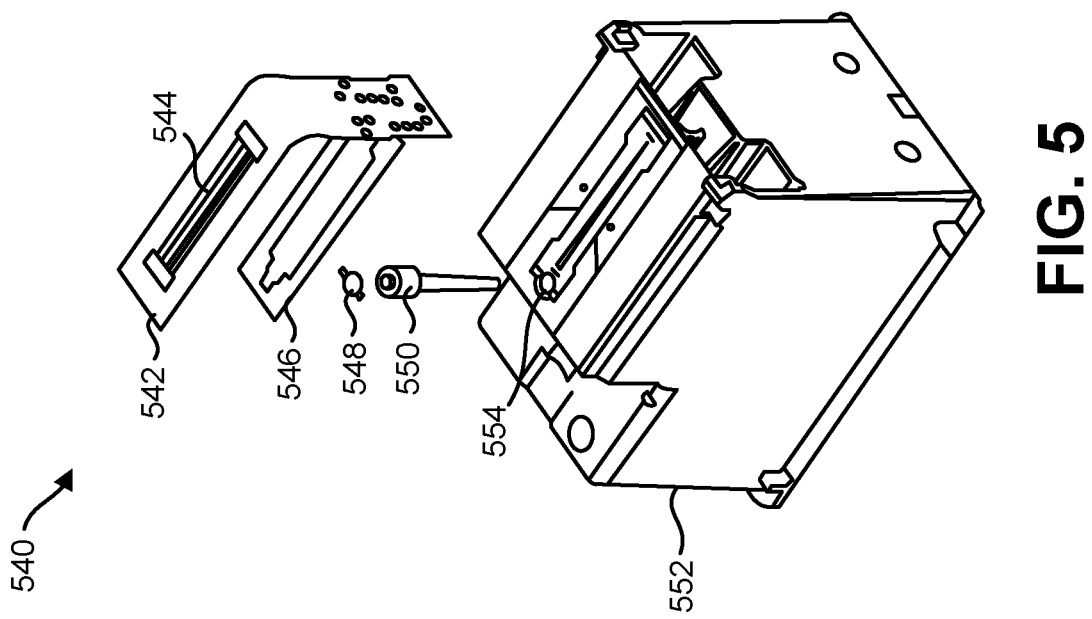
FIG. 5 is a diagram illustrating an exploded view of an example of a print cartridge.

FIG. 5 is a diagram illustrating an exploded view of an example of a print cartridge 540. In some examples, a print cartridge may include a graphite-loaded plastic pin disposed within a body of the print cartridge and in contact with print liquid. The pin may pass from an inside of the body to an outside of the body. In some examples, a print cartridge may include a conductive adhesive forming a connection between the pin and external circuitry. In the example illustrated in FIG. 5, the print cartridge 540 includes external circuitry 542, silicon printhead circuitry 544, a cover 546, conductive adhesive 548, a graphite-loaded plastic pin 550, and a body 552 that includes a routing 554. In some examples, a print cartridge may not include all of the components described in relation to FIG. 5.

In some examples, the body 552 may be an example of the fluid reservoir 106 described in relation to FIG. 1. In some examples, the graphite-loaded plastic pin 550 may be an example of the electrically conductive non-metal structure(s) 104, 204, 404 described in relation to FIG. 1, FIGS. 2A-2B, and/or FIG. 4. In some examples, the external circuitry 542 may be an example of the circuitry(ies) 110, 210, 310, 410 described in relation to FIG. 1, FIGS. 2A-2B, FIG. 3, and/or FIG. 4. In some examples, the cover 546 may be an example of the cover(s) 220, 420 described in relation to FIGS. 2A-2B and/or FIG. 4. In some examples, the silicon printhead circuitry 544 may be an example of the printhead(s) described herein. In some examples, the conductive adhesive 548 may be an example of the conductive adhesive(s) 108, 208, described in relation to FIG. 1 and/or FIGS. 2A-2B. In some examples, the routing 554 may be an example of the routing described in relation to FIG. 1.

In some examples, the external circuitry 542 may include a flexible layer or layers and a metal trace or traces. In some examples, the layer(s) may be polyimide (PI), polyethylene naphthalate (PEN), polyethylene terephthalate (PET), and/or other material(s), etc. In some examples, the layer(s) and/or the cover 546 may isolate and/or protect the metal traces. For instance, the metal trace(s) may be embedded within (e.g., sandwiched between) a layer and the cover 546. In some examples, each metal trace may include copper, nickel, palladium, gold, and/or other metal(s). In some examples, metal traces may have a thickness between 8 and 70 microns (e.g., 20 microns, 35 microns, etc.). In some examples, a flexible layer may have a thickness between 10 microns and 200 microns. In some examples, the metal trace(s) may include grounding circuitry and/or other traces (e.g., traces for carrying control signal(s) to the silicon printhead circuitry 544). In some examples, the external circuitry 542 may include a contact pad for coupling the grounding circuitry of the external circuitry 542 to a ground or common connection of a host device. A contact pad is a metal pad for contacting an interfacing structure (e.g., spring connectors, pins, etc.).

In some examples, the silicon printhead circuitry 544 may be coupled to the external circuitry 542. For example, the silicon printhead circuitry 544 may be attached to the external circuitry 542 with wire bonds and/or adhesive.

Examples of wire bonds may include metal plates, balls, pads, etc., that may be utilized to connect to (e.g., bond to, fuse to, join with, etc.) a wire or other connector.

In some examples, the body 552 may contain print liquid (e.g., ink, agent, etc.). The graphite-loaded plastic pin 550 may be disposed within (e.g., partially within) the body 552 of the print cartridge 540. The graphite-loaded plastic pin 550 may be in contact with the print liquid. The graphite-loaded plastic pin 550 may pass from inside the body 552 to outside the body 552. For example, the graphite-loaded plastic pin 550 may be situated or positioned within the body 552 through the routing 554. A head of the graphite-loaded plastic pin 550 may be disposed outside of the body 552.

In some examples, the body 552 may be welded to the graphite-loaded plastic pin 550. For example, the body 552 may be molded around the graphite-loaded plastic pin 550, such that carrier material of the graphite-loaded plastic pin 550 may be bonded and/or welded to the body 552. In some examples, the graphite-loaded plastic pin 550 may be sealed within the routing 554 of the print cartridge 540. For instance, the bonding, welding, and/or molding may seal the graphite-loaded plastic pin 550 in the routing 554.

In some examples, the external circuitry 542 may be coupled to the graphite-loaded plastic pin 550. For example, conductive adhesive 548 may form a connection between the graphite-loaded plastic pin 550 and the external circuitry 542. For instance, a trace structure, grounding circuitry, an uncovered region of the circuitry 542, and/or the cover 546 may be adhered to the graphite-loaded plastic pin 550 and/or to the body 552. For instance, the conductive adhesive 548 may be applied to the graphite-loaded plastic pin 550 and/or to the external circuitry 542 (e.g., trace structure, grounding circuitry, a conductive pad, copper pad, etc.), which may allow conduction between the graphite-loaded plastic pin 550 and the external circuitry 542. In some examples, the conductive adhesive 548 may connect and/or adhere to the graphite-loaded plastic pin 550 and/or to the external circuitry 542. For instance, the print cartridge 540 may include a graphite-loaded plastic pin 550 insert molded into the body 552, and electrically connected to a pad on the underside of the external circuitry 542 (e.g., flex circuit) by conductive adhesive 548.

In some examples, the external circuitry 542 may be coupled to the body 552. For example, an adhesive (e.g., the conductive adhesive), welding, pressure fit, mechanical attachment, and/or other approach may be utilized to attach the external circuitry 542 to the body 552. In some examples, a cover 546 may be disposed between the external circuitry 542 and the body 552. In some examples, the cover 546 may be utilized to attach, interface, and/or protect the external circuitry 542.

In some examples, the silicon printhead circuitry 544 may include a fluidic structure or structures (e.g., print liquid feed hole(s)). For example, the fluidic structure(s) may provide a path or paths for the print liquid in the body 552 to be ejected by the silicon printhead circuitry 544. In some examples, the fluidic structure(s) may be structured from silicon.

In some examples, the conductive adhesive 548 may reduce an electrical potential between the graphite-loaded plastic pin 550 and the silicon printhead circuitry 544 to reduce etching of the fluidic structures. In some examples, reducing the electrical potential may be accomplished as described in relation to FIG. 1. For instance, the graphite-loaded plastic pin 550 may be coupled to the external circuitry 542 (e.g., to a trace structure or conductive pad of the external circuitry 542) using conductive adhesive 548. The external circuitry 542 (e.g., trace structure, grounding circuitry, a conductive pad, metal pad, copper pad, etc.) may be coupled to the silicon printhead circuitry 544. For example, the graphite-loaded plastic pin 550 and the silicon printhead circuitry 544 may be coupled to a grounding conductor (e.g., trace structure, ribbon, plate, etc.) of the external circuitry 542, which may reduce or neutralize the electrical potential between the graphite-loaded plastic pin 550 and the silicon printhead circuitry 544. Reducing the electrical potential may reduce etching of the fluidic structure(s). For example, reducing the electrical potential may reduce an electrochemical reaction between the print liquid and the silicon printhead circuitry 544 (e.g., fluidic structure(s)). For instance, the graphite-loaded plastic pin 550, the conductive adhesive 548, the external circuitry 542, and the silicon printhead circuitry 544 may enable conduction between the print fluid and the silicon printhead circuitry 544 in contact with the print fluid, which may reduce the electrical potential.

Figure 6:
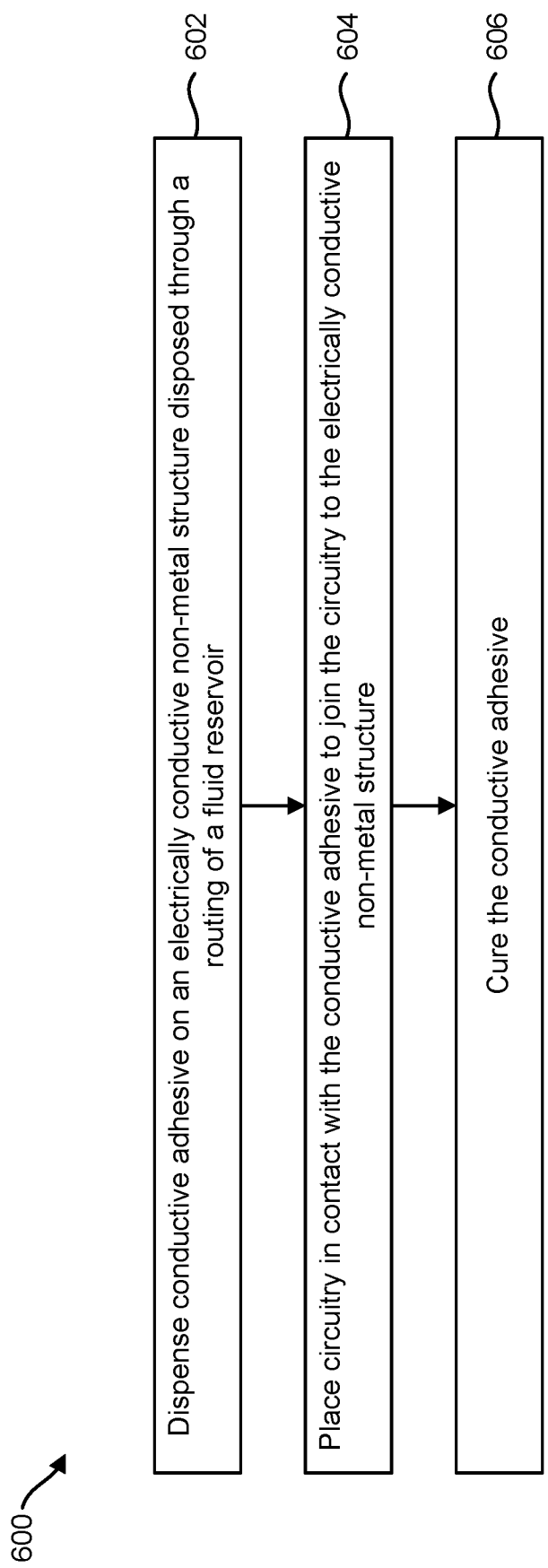
FIG. 6 is a flow diagram illustrating one example of a method for manufacturing a fluid ejection device.

FIG. 6 is a flow diagram illustrating one example of a method 600 for manufacturing a fluid ejection device. In some examples, the method 600 may be performed by an assembly machine or machines. In some examples, the method 600 may be performed to produce the fluid ejection device 100 described in relation to FIG. 1 and/or the print cartridge 540 described in relation to FIG. 5. In some examples, the method 600 may include dispensing 602 conductive adhesive (e.g., a dollop of conductive adhesive) on an electrically conductive non-metal structure disposed through a routing of a fluid reservoir. For instance, a dollop of conductive adhesive may be dispensed (e.g., extruded from a conductive adhesive dispenser) onto an electrically conductive non-metal structure (e.g., onto a head of an electrically conductive non-metal structure), where the electrically conductive non-metal structure may be disposed through (e.g., attached to, molded into, etc.) a routing of a fluid reservoir. In some examples, dispensing 602 the conductive adhesive may be performed after molding a fluid reservoir around the electrically conductive non-metal structure. For example, molten polymer may be molded (e.g., injection molded) around the structure (e.g., around a circumference of the structure, around a circumference of a bulge of the structure, etc.). In some examples, molding the fluid reservoir may weld the structure to the fluid reservoir. In some examples, molding the reservoir around the structure may form a seal around the structure. In some examples, the structure includes a first polymer with graphite fibers. For instance, the first polymer may be a carrier material and the graphite fibers may be a conductive non-metal material of the structure. In some examples, the reservoir includes a second polymer. In some examples, the conductive adhesive may be dispensed on a pedestal or pedestals of the fluid reservoir.

In some examples, the method 600 may include placing 604 circuitry in contact with the conductive adhesive to join the circuitry to the electrically conductive non-metal structure. For example, the circuitry may be moved into contact (e.g., placed on, pressed on, etc.) the conductive adhesive. For instance, the circuitry may be aligned with the electrically conductive non-metal structure and/or the fluid reservoir such that a trace structure and/or unprotected region of the circuitry is aligned with a head of the electrically conductive non-metal structure. The circuitry and the fluid reservoir may be brought together. The conductive adhesive may contact the circuitry and/or a cover of the circuitry. In some examples, the conductive adhesive may fill all or a portion of a gap between a head of the electrically conductive non-metal structure and a pedestal or pedestals.

In some examples, the method 600 may include curing 606 the conductive adhesive. For example, the method 600 may include curing 606 the conductive adhesive by applying radiation. Examples of radiation include heat, ultraviolet (UV) radiation, and/or microwave radiation. The radiation may be applied to the conductive adhesive. In some examples, curing 606 the conductive adhesive may cause the conductive adhesive to set, harden, and/or adhere to a surface or surfaces (e.g., the electrically conductive non-metal structure, the circuitry, and/or the fluid reservoir).

Figure 7:
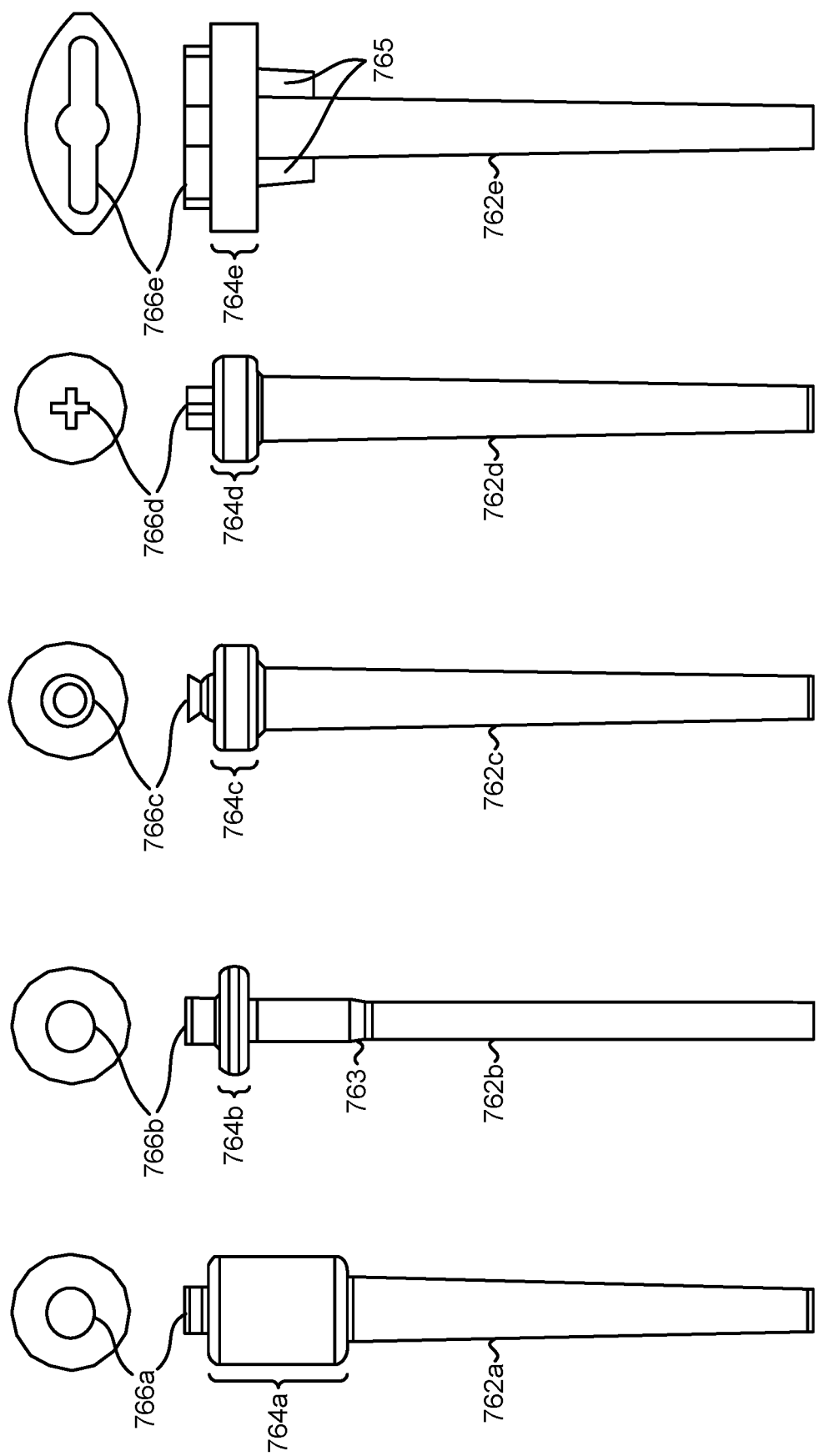
FIG. 7 is a diagram illustrating examples of graphite-loaded plastic pins.

FIG. 7 is a diagram illustrating examples of graphite-loaded plastic pins 762*a-e*. The graphite-loaded plastic pins 762*a-e* may be examples of the electrically conductive non-metal structures and/or graphite loaded plastic pins described herein (e.g., electrically conductive non-metal structures 104, 204, 404 described in relation to FIG. 1, FIG. 2, and/or FIG. 4, and/or the graphite loaded plastic pin 550 described in relation to FIG. 5). In some examples, the graphite-loaded plastic pin variations described in relation to FIG. 7 may be utilized instead of the electrically conductive non-metal structures and/or graphite loaded plastic pins described in relation to other Figures.

In some examples, each of the graphite-loaded plastic pins 762*a-e* may include carrier material (e.g., plastic) and electrically conductive non-metal material (e.g., graphite). Each of the examples illustrates a top-down view and an elevation view of the graphite-loaded plastic pins 762*a-e*.

A first graphite-loaded plastic pin 762*a* may include a first bulge 764*a* and a first head 766*a*. For example, the first head 766*a* may be a cylindrical structure at an end of the first graphite-loaded plastic pin 762*a*. A bulge is a portion of a structure that is larger than another portion of the structure in a dimension. For example, the first bulge 764*a* is larger in width or diameter relative to a shaft portion of the first graphite-loaded plastic pin 762*a*. A shaft portion is a portion of a structure from a bulge to an end of the structure opposite from the head. An end portion of the first head 766*a* may be disposed on an outside of a fluid reservoir. In some examples, the end portion of the first head 766*a* may be coupled to grounding circuitry through a routing. In some examples, a portion of the first bulge 764*a* may be disposed within the routing and/or may be welded to the routing. For instance, a head of the structure may be placed in a mold (e.g., in a mold depression) for molding a fluid reservoir. A side of a bulge may be in contact with the mold during molding (e.g., a side towards the head). During molding, liquid material (e.g., polymer) may flow or be injected around a portion of a bulge to form a routing. The portion of the bulge may weld to the liquid material (e.g., routing). In some examples, another portion of the first bulge 764*a* may be situated in an inside of a fluid reservoir and/or may be in contact with the fluid. The first bulge 764*a* may be approximately 3 millimeters (mm) in length. The first bulge 764*a* may provide greater moldability (e.g., may be easier to manufacture) due to a larger length (in comparison with other bulges 764*b-d*, for example, where the second bulge 764*b* may have a length of 0.7 mm).

A shaft portion of the first graphite-loaded plastic pin 762*a* may be situated in an inside of the fluid reservoir and/or may be in contact with the fluid. The shaft portion of the first graphite-loaded plastic pin 762*a* may be conical in shape. For example, the shaft portion may taper to a smaller diameter (over a portion of the length or over the entire length of the shaft portion, for instance) towards an end that is opposite from the first head 766*a*. A shaft diameter of the first graphite-loaded plastic pin 762*a* may be 400 micrometers (μm) larger than a shaft diameter of a second graphite-loaded plastic pin 762*b*. A larger diameter shaft may provide a larger surface area that is in contact with the fluid, which may increase the efficacy of the structure in reducing or neutralizing etching. For instance, the first graphite-loaded plastic pin 762*a* may have a surface area of 49.6 mm$^2$ in contact with fluid, while the second graphite-loaded plastic pin 762*b* may have a surface area of 26.6 mm$^2$ in contact with fluid.

A second graphite-loaded plastic pin 762*b* may include a second bulge 764*b* and a second head 766*b*. The second head 766*b* may be a cylindrical structure at an end of the second graphite-loaded plastic pin 762*b*. An end portion of the second head 766*b* may be disposed on an outside of a fluid reservoir. In some examples, the end portion of the second head 766*b* may be coupled to grounding circuitry through a routing. In some examples, a portion of the second bulge 764*b* (e.g., an entire outer circumference) may be disposed within the routing and/or may be welded to the routing. The portion of the second bulge 764*b* may weld to the liquid material (e.g., routing). In some examples, the second bulge 764*b* may not be in contact with the fluid. The second bulge 764*b* may be approximately 0.7 mm in length. The second bulge 764*b* may provide less moldability (e.g., may be more difficult to manufacture) due to a shorter length (in comparison with the first bulge 764*a*, for example).

A shaft portion of the second graphite-loaded plastic pin 762*b* (or a portion of the shaft portion, for example) may be situated in an inside of the fluid reservoir and/or may be in contact with the fluid. The shaft portion of the second graphite-loaded plastic pin 762*b* may be cylindrical in shape with a taper 763 over a portion of the shaft (which may be utilized as a press-fit lead-in in some examples). For example, the shaft portion may taper to a smaller diameter (over the portion of the length of the shaft portion, for instance) towards an end that is opposite from the second head 766*b*.

A third graphite-loaded plastic pin 762*c* may include a third bulge 764*c* and a third head 766*c*. The third head 766*c* may be an undercut cylindrical structure at an end of the third graphite-loaded plastic pin 762*c*. The undercut is a narrowed portion of the head. In some examples, the undercut may provide a mechanical interlock with conductive adhesive for coupling the third head 766*c* to grounding circuitry. An end portion of the third head 766*c* may be disposed on an outside of a fluid reservoir. In some examples, the end portion of the third head 766*c* may be coupled to grounding circuitry through a routing. In some examples, a portion of the third bulge 764*c* (e.g., an entire outer circumference) may be disposed within the routing and/or may be welded to the routing (during molding, for example). In some examples, the third bulge 764*c* may not be in contact with the fluid. The third bulge 764*c* may be approximately 1 mm in length.

A shaft portion of the third graphite-loaded plastic pin 762*c* (or a portion of the shaft portion, for example) may be situated in an inside of the fluid reservoir and/or may be in contact with the fluid. The shaft portion of the third graphite-loaded plastic pin 762*c* may be conical in shape with a taper over the shaft. For example, the shaft portion may taper to a smaller diameter (over the length of the shaft portion, for instance) towards an end that is opposite from the third head 766*c*.

A fourth graphite-loaded plastic pin 762*d* may include a fourth bulge 764*d* and a fourth head 766*d*. The fourth head 766*d* may be a cross-shaped structure at an end of the fourth graphite-loaded plastic pin 762*d*. In some examples, the cross-shaped structure may provide increased surface area for conductive adhesive for coupling the fourth head 766d to grounding circuitry. An end portion of the fourth head 766d may be disposed on an outside of a fluid reservoir. In some examples, the end portion of the fourth head 766d may be coupled to grounding circuitry through a routing. In some examples, a portion of the fourth bulge 764d (e.g., an entire outer circumference) may be disposed within the routing and/or may be welded to the routing (during molding, for example). In some examples, the fourth bulge 764d may not be in contact with the fluid. The fourth bulge 764d may be approximately 1 mm in length.

A shaft portion of the fourth graphite-loaded plastic pin 762d (or a portion of the shaft portion, for example) may be situated in an inside of the fluid reservoir and/or may be in contact with the fluid. The shaft portion of the fourth graphite-loaded plastic pin 762d may be conical in shape with a taper over the shaft. For example, the shaft portion may taper to a smaller diameter (over the length of the shaft portion, for instance) towards an end that is opposite from the fourth head 766d.

A fifth graphite-loaded plastic pin 762e may include a fifth bulge 764e and a fifth head 766e. The fifth head 766e may be a partially cylindrical structure with an integrated rail at an end of the fifth graphite-loaded plastic pin 762e. The fifth graphite-loaded plastic pin 762e may also include wing structures 765. In some examples, the wing structures 765 may act as keying features to orient the pin 762e in a mold tool, as the pin 762e is not rotationally symmetrical. The wing structures 765 may fit into negative spaces in the mold tool to hold the pin 762e to provide a target orientation and/or rotation relative to the mold tool. In some examples, the partially cylindrical structure with a rail may provide a surface on which to dispense conductive adhesive. Using the rail as a dispense surface for conductive adhesive may enable a line dispense (rather than a dollop dispense, for instance). In some examples, a line dispense may be easier to control during processing. For instance, other dispensing approaches may have more factors to control when separately starting and stopping dispensing. An end portion of the fifth head 766e may be disposed on an outside of a fluid reservoir. In some examples, the end portion of the fifth head 766e may be coupled to grounding circuitry through a routing. In some examples, a portion of the fifth bulge 764e (e.g., an entire outer circumference) may be disposed within the routing and/or may be welded to the routing (during molding, for example). In some examples, the fifth bulge 764e may not be in contact with the fluid. The fifth bulge 764e may be approximately 1 mm in length.

A shaft portion of the fifth graphite-loaded plastic pin 762e (or a portion of the shaft portion, for example) may be situated in an inside of the fluid reservoir and/or may be in contact with the fluid. The shaft portion of the fifth graphite-loaded plastic pin 762e may be conical in shape with a taper over the shaft. For example, the shaft portion may taper to a smaller diameter (over the length of the shaft portion, for instance) towards an end that is opposite from the fifth head 766e.

In some examples, features of the graphite-loaded plastic pins 762a-e may be interchanged. For example, the third head 766c or the fourth head 766d may be interchanged with the first head 766a to produce a graphite-loaded plastic pin with the first bulge 764a and shaft structure. Other variations may be implemented.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples of techniques and structures are described herein, the techniques and structures are not limited to the examples. Variations of the examples described herein may be implemented within the scope of the disclosure. For example, operations, functions, aspects, or elements of the examples described herein may be omitted or combined.

The invention claimed is:

1. A fluid ejection device, comprising:
an electrically conductive non-metal structure disposed within a body of the fluid ejection device and in contact with fluid in a fluid reservoir, wherein the electrically conductive non-metal structure passes from an inside of the body to an outside of the body; and
conductive adhesive forming a conductive connection between the electrically conductive non-metal structure and circuitry.

2. The fluid ejection device of claim 1, wherein the non-metal structure comprises a head disposed outside of the fluid reservoir.

3. The fluid ejection device of claim 2, wherein the head is disposed within an exterior recess of the fluid reservoir.

4. The fluid ejection device of claim 1, comprising pedestals disposed on an exterior of the fluid reservoir, wherein the pedestals are distanced from the electrically conductive non-metal structure.

5. The fluid ejection device of claim 4, wherein the pedestals are disposed within an exterior recess of the fluid reservoir.

6. The fluid ejection device of claim 1, wherein the conductive adhesive joins the circuitry to the electrically conductive non-metal structure and to an exterior surface of the fluid reservoir.

7. The fluid ejection device of claim 1, wherein the circuitry comprises grounding circuitry, and wherein the conductive adhesive joins the grounding circuitry to the electrically conductive non-metal structure.

8. The fluid ejection device of claim 1, wherein conductive adhesive is to mitigate an electrical potential between the fluid and the circuitry.

9. The fluid ejection device of claim 1, wherein a contacting region of the circuitry comprises an air escape path.

10. The fluid ejection device of claim 9, wherein the contacting region comprises a trace structure having separated branches.

11. A print cartridge, comprising:
a graphite-loaded plastic pin disposed within a body of the print cartridge and in contact with print liquid, wherein the pin passes from an inside of the body to an outside of the body; and
conductive adhesive forming a connection between the pin and external circuitry.

12. The print cartridge of claim 11, wherein the pin is sealed within a routing of the print cartridge.

13. The print cartridge of claim 11, further comprising:
silicon printhead circuitry coupled to the external circuitry, wherein the silicon printhead circuitry comprises fluidic structures, and wherein the conductive adhesive is to reduce an electrical potential between the pin and the silicon printhead circuitry to reduce etching of the fluidic structures.

14. A method, comprising:
dispensing conductive adhesive on a graphite-loaded plastic structure disposed through a joint of a fluid reservoir, wherein the graphite-loaded plastic structure passes from an inside of the fluid reservoir to an outside of the fluid reservoir; and placing circuitry in contact with the conductive adhesive to join the circuitry to a conductive non-metal structure.

15. The method of claim 14, further comprising curing the conductive adhesive by applying radiation.

\* \* \* \* \*